United States Patent
Gephart et al.

(10) Patent No.: US 7,954,704 B1
(45) Date of Patent: Jun. 7, 2011

(54) ELECTRONIC PAYMENT SYSTEM WITH PIN AND SUB-ACCOUNT CONFIGURATIONS

(75) Inventors: Brian R. Gephart, South Jordan, UT (US); Darrell Redford, Layton, UT (US)

(73) Assignee: Transsec Data Limited Liability Compnay, Wilmington, DE (US)

( * ) Notice: Subject to any disclaimer, the term of this patent is extended or adjusted under 35 U.S.C. 154(b) by 73 days.

(21) Appl. No.: 11/350,205

(22) Filed: Feb. 8, 2006

Related U.S. Application Data

(60) Provisional application No. 60/651,236, filed on Feb. 9, 2005.

(51) Int. Cl.
*G06K 5/00* (2006.01)

(52) U.S. Cl. .......................... 235/380; 340/5.85; 705/72

(58) Field of Classification Search ....... 235/375–382.5; 705/41–44, 62–72; 340/5.85
See application file for complete search history.

(56) References Cited

U.S. PATENT DOCUMENTS

| | | | | |
|---|---|---|---|---|
| 5,350,906 A * | 9/1994 | Brody et al. | .................. | 235/379 |
| 5,731,575 A * | 3/1998 | Zingher et al. | ................. | 235/379 |
| 5,917,928 A * | 6/1999 | Shpuntov et al. | ............. | 382/124 |
| 5,953,710 A * | 9/1999 | Fleming | ......................... | 235/380 |
| 6,339,766 B1 * | 1/2002 | Gephart | .......................... | 705/44 |
| 6,845,906 B2 * | 1/2005 | Royer et al. | .................... | 235/379 |
| 7,204,412 B2 * | 4/2007 | Foss, Jr. | ......................... | 235/380 |
| 7,383,213 B1 * | 6/2008 | Walter | ............................ | 705/35 |
| 7,613,658 B2 * | 11/2009 | Coyle | .............................. | 705/41 |
| 2001/0032184 A1 * | 10/2001 | Tenembaum | .................... | 705/41 |
| 2002/0029337 A1 * | 3/2002 | Sudia et al. | .................... | 713/176 |
| 2002/0139844 A1 * | 10/2002 | Rochman et al. | ............. | 235/380 |
| 2003/0048890 A1 * | 3/2003 | Weiss et al. | ............... | 379/201.02 |
| 2003/0208439 A1 * | 11/2003 | Rast | ................................ | 705/38 |
| 2005/0010649 A1 * | 1/2005 | Payne et al. | .................... | 709/217 |
| 2005/0082364 A1 * | 4/2005 | Alvarez et al. | ................ | 235/381 |
| 2005/0256801 A1 * | 11/2005 | Bucci et al. | ..................... | 705/39 |
| 2006/0064378 A1 * | 3/2006 | Clementz et al. | ............... | 705/40 |
| 2006/0076400 A1 * | 4/2006 | Fletcher | ......................... | 235/379 |
| 2010/0241545 A1 * | 9/2010 | O'Connor et al. | .............. | 705/35 |

OTHER PUBLICATIONS

Dave Daniels, Credit Card and Identity Fraud Scams; Website; www.cfca.org; May 29, 2001.
www.CrimeReduction.gov.uk; Business Crime—Chip and Pin credit cards.
Chip and PIN; UK Chip and PIN Programme: New Press Office Goes Live; Press Release; www.chipandpin.co.uk; Jan. 7, 2003.
Chip and PIN; Update on Chip and PIN Trial; Press Release; www.chipandpin.co.uk; Mar. 26, 2003.

(Continued)

*Primary Examiner* — Thien M. Le
*Assistant Examiner* — Christle I Marshall
(74) *Attorney, Agent, or Firm* — Sterne, Kessler, Goldstein & Fox, PLLC

(57) ABSTRACT

Implementations of the present invention provide systems, methods, and apparatus for stopping unauthorized transactions before they are processed, as well as for creating and using one or more sub-accounts. For example, a debit or credit account can be activated or deactivated at will through various spend control mechanisms, which can be limited by specified time periods, numbers of transactions, and/or monetary amounts. Further implementations also relate to using a unique 6-digit identification number (or biometric information) that is known only to the account granting institution and the primary account owner for the various types of activation/deactivation.

22 Claims, 2 Drawing Sheets

OTHER PUBLICATIONS

Chip and PIN; Banks, Building Societies & Retailers Join Forces for Radical Fraud-Busting Programme; Press Release; www.chipandpin.co.uk; Apr. 11, 2003.

Chip and PIN; Plans for Chip and PIN Rollout Announced; Press Release; www.chipandpin.co.uk; Oct. 2, 2003.

Chip and PIN; Introducing Chip and PIN; www.chipandpin.co.uk; May 26, 2004.

Visa EU; Smart Payment Product Principles; Version 3.0; Jul. 2003; accessed Jul. 30, 2007 at www.chipandpin.co.uk;.

Chip and PIN; Home page of www.chipandpin.co.uk; accessed Jul. 30, 2007.

Chip and PIN; Index/Business page of www.chipandpin.co.uk; accessed Jul. 30, 2007.

Chip and PIN; Index/Consumer Information page of www.chipandpin.co.uk; accessed Jul. 30, 2007.

Chip and PIN; Index/Media Centre page of www.chipandpin.co.uk; accessed Jul. 30, 2007.

Chip and PIN; Index/Media Centre/News Releases page of www.chipandpin.co.uk; accessed Jul. 30, 2007.

Chip and PIN; Index/Outside the UK page of www.chipandpin.co.uk; accessed Jul. 30, 2007.

Chip and PIN; Index/Reference Library page www.chipandpin.co.uk; accessed Jul. 30, 2007.

* cited by examiner

ELECTRONIC PAYMENT SYSTEM WITH PIN AND SUB-ACCOUNT CONFIGURATIONS

CROSS-REFERENCE TO RELATED APPLICATIONS

The present invention claims the benefit of prior to U.S. Provisional Patent Application No. 60/651,236, filed on Feb. 9, 2005, entitled "Electronic Payment System with PIN and Sub-Account Configurations," the entire contents of which are incorporated herein by reference.

BACKGROUND OF THE INVENTION

1. The Field of the Invention

Implementations of the present invention relate to systems for electronically transferring funds based on one or more PIN configurations that can be set up by an account owner.

2. Background and Relevant Art

During recent years, the use of cash in financial transactions has been increasingly replaced with various forms of electronic payment. For example, credit cards and debit cards are now commonly used by consumers to make purchases, or to otherwise authorize the transfer of funds to merchants. Such electronic forms of payment have become widely used for many reasons, including convenience and the ability to maintain an electronic record of transactions.

In order to enable electronic payment, a bank or another financial institution typically establishes an account for a consumer and issues a card that enables a consumer to conveniently authorize funds to be drawn from the account. The account is generally associated with an account number that uniquely identifies the account. Often, the account number is printed on the face of the card issued to the consumer and may also be encoded in a magnetic strip on the card. In order to execute a transaction using the account, the consumer ordinarily presents the card to a merchant, who makes a copy of the account number written or encoded on the card. The merchant ordinarily verifies that the cardholder is authorized to make a purchase using the card by requiring the card holder's signature, or by receiving a 4-digit personal identification number (PIN).

In particular, signatures traditionally represent a first line of defense to prevent the unauthorized use of credit and debit cards by persons other than the rightful account holder. The cardholder's signature can be seen as evidence of the identity of the person using the card. Unfortunately, signatures can frequently be forged by unauthorized persons. Moreover, merchants sometimes do not carefully verify that the signature presented by a person using a card matches the authorized signature. There are also many commercial environments in which signatures cannot be obtained, such as automated teller machines, telephone commerce, self-serve gasoline pumps, and Internet and other online transactions.

By contrast, the 4-digit PIN is supposedly known only by the cardholder, and its use by a person using the card generally verifies that the person is an authorized cardholder. One recently developed version of the traditional PIN verification is called a "Chip-n-Pin" system. The Chip-n-Pin system generally involves a credit or debit card with a PIN embedded and encrypted on an electronic chip. The system prohibits all requested transactions with the given credit or debit card unless the person using the card enters the correct 4-digit PIN, rather than simply a signature. Some estimate that this system will be cost-effective despite a fairly expensive initial set up. Unfortunately, thieves have recently become increasingly adept at discovering 4-digit PIN information. For example, it is somewhat common for people to choose a 4-digit PIN based on some easily identifiable personal information, such as the account owner's (or family member's) birthday in forward or reverse order.

In addition to these deficiencies, signature or PIN verification systems still add little benefit for "card not present" transactions, such as credit or debit transactions taking place over telephone, Internet, or other networks. In particular, many such transactions require no other independent verification other than just the credit or debit card number and expiration date. Thus, many consumers are hesitant to transmit their account numbers over open networks. In particular, some fear that their account numbers will be intercepted, while others are reluctant to divulge their account numbers and PINs to persons who are essentially strangers.

While encryption technology has been used to reduce the likelihood that credit and debit card numbers can be intercepted from the Internet during transmission, security techniques that would recently have been foolproof are now subject to breach. Thus, the difficulty of preventing the unauthorized use of credit or debit cards has made many consumers hesitant to use such forms of payment over the telephone, Internet, or other communication networks, despite the rapid increase in the availability of commerce over such networks.

Other problems associated with traditional accounts relate to how the account owner can allow the account to be used by a friend or family member. For example, a given account owner may want to provide a child with access to a credit account when the child goes away to school, or goes on a vacation. The account owner, at the same time, however, may want to configure how the account is used in terms of spending limits. Typically, the account owner can issue a secondary card to the child, but has few or no provisions for setting the card up with prescribed spending limits, much less limits on the types or numbers of transactions for which the secondary card can be used. In another example, the account owner may want to set the account up with several individual accounts, such as can be used to pay one or more bills, without having to leave the entire limit of the card open to the relevant entity.

Accordingly, an advantage can be realized with systems, methods, and computer program products that provide account owners a greater degree of security and control over the use of their accounts in electronic commerce purchases.

BRIEF SUMMARY OF THE INVENTION

Implementations of the present invention solve one or more of the problems in the art with systems and methods for setting up novel PIN and account configurations, which in turn allow an account owner a high degree of control and configurability. For example, one implementation of the present invention provides an account owner with the ability to setup a primary account with a PIN that is at least as long as (or longer than) 4-digits, such as a 6-digit PIN, in order to enhance security. Furthermore, the account owner can set up one or more corresponding sub-accounts that are limited based on a number of configurable parameters, such as a certain amount of time, a number of transactions, sales prices per transaction, cumulative purchase amounts, biometric data, and so forth. The account owner can also set up and/or deactivate this or other secondary accounts using the same PIN. As such, implementations of the present invention can allow an account owner to operate in many respects as an issuing bank.

A method in accordance with an implementation of the present invention can include setting up a primary account, such as by setting up a credit or debit account with a bank. The method can also involve setting up one or more PINS to be used with the account, where the PINS are set with a user-determined length for added security. In addition, the method can involve setting up one or more sub-accounts that correspond to the initial account set up by the user with the bank. Furthermore, the method can involve setting up spend controls for each of the one or more sub-accounts.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
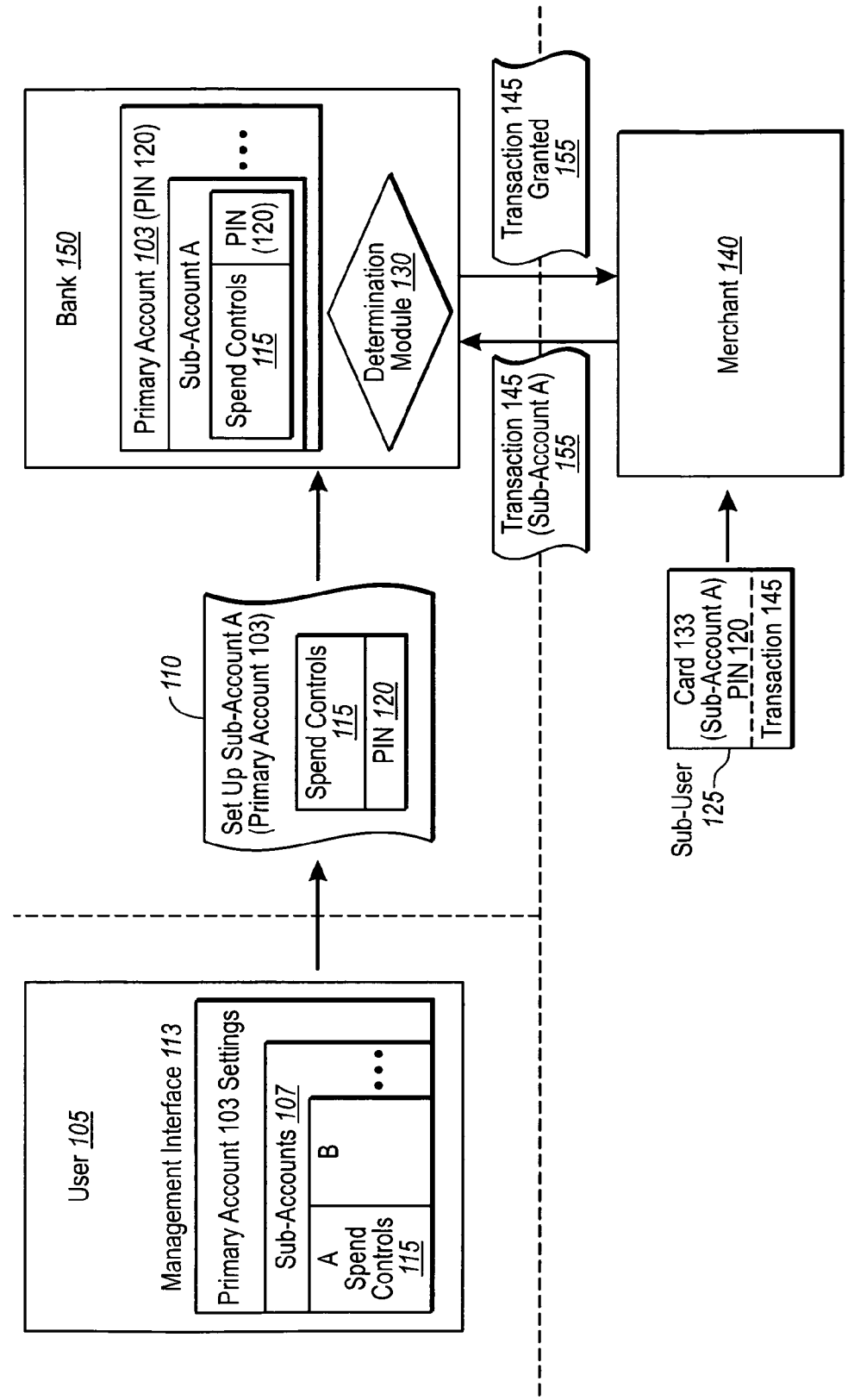
FIG. 1 illustrates an overview schematic diagram in which an account owner sets up one or more sub-accounts with a bank, and in which a sub-account owner presents one of the created sub-accounts to a merchant, in accordance with an implementation of the present invention.

The present invention relates to electronic transaction systems in which an account number can be used to activate one or more sub-accounts, which can be limited for a wide variety of parameters. In particular, the present invention relates to systems and methods for setting up novel PIN and account configurations, which in turn allow an account owner a high degree of control and configurability. For example, one implementation of the present invention provides an account owner with the ability to setup a primary account with a PIN that is at least as long as (or longer than) 4-digits, such as a 6-digit PIN, in order to enhance security. Furthermore, the account owner can set up one or more corresponding sub-accounts that are limited based on a number of configurable parameters, such as a certain amount of time, a number of transactions, sales prices per transaction, cumulative purchase amounts, biometric data, and so forth. The account owner can also set up and/or deactivate this or other secondary accounts using the same PIN. As such, implementations of the present invention can allow an account owner to operate in many respects as an issuing bank.

For example, in one implementation of the present invention, when a primary account is issued as a credit or debit card account, the corresponding card is delivered by the issuing bank as inactive. A secondary card is also sent to the account owner. The issuing bank further sends a PIN, such as, for example, a 6-digit PIN, that will activate the primary card in a separate mailing. The account owner uses this PIN to activate the primary account, such that simply calling a telephone number to activate the card will not suffice. Thereafter the account owner can change the PIN to another number.

Although any number or length of PIN numbers can be used, it will be appreciated that any digit length number greater than 4 in a PIN represents an advancement in PIN security, at least initially since conventional PIN length is 4-digits. In particular, the longer the associated security number (i.e., PIN, in this case), the greater the difficulty in decoding the PIN, and hence the greater the amount of security. Nevertheless, in at least one implementation of the present invention, a 6-digit PIN is used since it is easier to remember than much longer PIN numbers, and since many standard numbers are of a different digit length than 6. For example, a 7-digit PIN would invite usage of a person's telephone number, and a 9-digit PIN would invite use of the account owner's Social Security Number. Thus, in at least one implementation, the 6-digit PIN offers two orders of magnitude greater security than a 4-digit PIN.

In accordance with at least one implementation of the present invention, the primary account owner can also activate or deactivate the card associated with the account at will, such as when the card for the primary account is stolen. To do so, the primary account owner uses the PIN at a telephone, Internet, or other connection to the primary account, and deactivates the card. This is contrasted with conventional methods having to call the issuing bank, wait for a representative, and go through the hassle of canceling the card. Similarly, if the card was misplaced, and the account owner fears it stolen, the primary account owner can deactivate the card, or even the corresponding secondary account (or card) in the same way. Once the account owner finds the card, the account owner can activate the card again using their telephone, or by accessing the account over the Internet, again without the need of calling customer service, going through the wait, waiting for another card to be reissued, etc.

As described herein, the account owner can also configure the primary account with one or more secondary cards (also referred to as sub-accounts), such that the primary card never needs to be used at all. An example list of potential secondary accounts follows, which are characterized by person to use the secondary accounts, or purpose of the secondary account.

| | |
|---|---|
| Family | Spouse |
| | Children |
| | Students |
| Categories | Groceries |
| | Bill Payment |
| | Entertainment |
| | Internet Purchases |
| | General Purchases |
| Small Business | Office Supplies |
| | Fuel |
| | Travel and Expense |

Each secondary account can be tied to the primary account, and is therefore subject to the credit or debit limit of the primary account. The credit or debit card that corresponds to the secondary account can be issued and activated "at will" by the primary account owner. Furthermore, as will be discussed in greater detail herein, the primary account owner can configure the corresponding secondary account with or without one or more "spend controls".

The primary account owner, who knows the 6-digit PIN, thus has the capability of limiting usage of any of the corresponding secondary cards or secondary accounts that are tied to the primary account in any number of appropriate ways. The following examples of such usage are based on a $10,000 limit.

Example 1

The primary account owner is uncomfortable with the total credit limit of the primary account. The primary account owner uses the 6-digit PIN to assign $1,000 of the available credit to the secondary card, which the primary account owner takes on a business trip.

Example 2

A business owner that owns the primary account can segment the primary account into multiple, spend-limited secondary accounts, and thus offer employees a corporate card that is activated only for a certain amount. The business owner can assign each employee his own card and have the corresponding card activated on an as-needed basis, or as a basis for providing a per diem. Because each card has its own number, and is still tied to the primary account, the business owner can easily identify purchases made on each sub-account card, and also limit a per diem. Having separate numbers can make reporting much simpler for the issuing bank as well.

Example 3

The primary account owner activates the card for a single transaction, such as to allow the account owner, an employee, a friend, or family member, to purchase airline tickets over the Internet. The spend control associated with the card can automatically deactivate the card after the allowed transaction has occurred.

Example 4

The primary account owner is going shopping for a child who is going away to college. The primary account owner knows they will be spending about $1,800.00, and estimates that they will go to about 5 stores. The primary account owner activates the card for six transactions for flexibility, and a total dollar limit of $1,800. The primary account owner also activates the card for a single day.

Example 5

The primary account owner will be out of town for the next week on vacation or business, but has no idea of the expenses that will be incurred. The primary account owner activates the secondary card for the total credit limit of the primary account, but limits the active time to a single week. When the week expires, the card is automatically inactivated subject to any other intervention by the primary account owner.

Example 6

The primary account owner gives a secondary card to their child, who is going away to college. The primary account owner knows that weekly expenses for their child are in a specific range. The primary account owner therefore activates the card subject to a weekly spending limit of the specified range. The primary account owner also has the option of assigning a larger dollar amount at the first of each semester for books, tuition, and fees, or even for specific merchants (e.g., bookstores, etc.) The primary account owner has the further option of limiting purchases to specific merchants, such as at selected grocery stores, campus facilities or book stores, and the like.

Example 7

The primary account owner can allow or assign access to the primary account by a different card than the secondary card, such as by an account that is not associated with the issuing bank. For example, the primary account owner could allow a person to use their personal card (ATM/Debit) to purchase a specific item for another friend, such as tickets to a local concert, wherein the ATM/Debit card of the outside account has temporary, spend control-limited access to the primary account. In particular, the primary account owner could limit primary account access based on the specific transaction and dollar amount only, taking the funds from the primary account instead of the account on the friend's card.

Example 8

Another option for securing the card is to embed the information in the card itself regarding the specifics of the examples and transactions described herein. In particular, aspects of the present invention allow a primary account owner to add the detailed information for sub-account configuration to be stored in a chip, on a magnetic strip, a holographic image or related encoding, or by any other appropriate means to allow combinations of the options as listed above. In some cases, a corresponding card writer and reader is provided to the primary account owner to encode information on each secondary account or corresponding card.

Example 9

Instead of (or in addition to) an assigned PIN, the primary account, or any other corresponding secondary or sub-account, can be activated using a biological indicator, such as a fingerprint. Online transactions therefore can be coupled with a biometric reader attached to a computer system that is also connected to the issuing bank through a network connection, such as an Internet connection. Similarly, phone systems could be used to transmit voice identification, or to convert an optical image into an encoded audio, and transmit the identification over the phone to verify the card user's identity or authorization.

Example 10

The primary account owner can also create a secondary account with spend controls that allow the secondary account to be used as a "card-less" Internet gift card. The primary account owner simply chooses an option through an electronic interface, and the system presents the next valid sub-account number. The sub-account number can be used at any online store that accepts credit cards. Thus, the sub-account number can be used by the recipient at any type of store that accepts credit or debit cards, not just stores that accept a specific store gift card. The gift card can even be used in conjunction with their own ATM/Debit card, if the issuer so chooses (such as a sub-account assigned to an outside card—e.g., Example 7 above).

Example 11

The primary account owner can also create a secondary account with spend controls that allow recurring monthly purchases to move through the account. Authorization can be given for a specific vendor, account number, and amount on a certain day of the month (such as a car payment); monthly utilities to be billed while setting a maximum amount (such as $50 for phone service). For example, the card holder might assign the card to be used only for memberships to a golf or athletic club.

Example 12

The primary account owner can also create a secondary account with spend controls related to the examples listed above, but also enabling geographically limited access, such as for travelers in a certain country, or for personnel assigned to a specific region. Thus, stolen information related to the card cannot be used outside the defined region to access funds tied to the account.

Spend Controls

As disclosed herein, primary account owners can create secondary accounts (or sub-accounts) that are configured with one or more "spend controls". In general, spend controls are processing rules, limits, and other variables defined by the primary account owner, for controlling individual sub-accounts as needed or wanted. A sample list is presented below.

| | |
|---|---|
| Date/Time | Set the length of time a sub-account can be active and/or the date. Choose to have a sub-account active for a period of time. (e.g. between 12:00 pm-9:00 pm, Monday the 19$^{th}$) |
| Merchant or Geographical Region | Restrict the sub-account spending to a specific merchant or merchants, or to a region such as a county or part of a state (e.g. Tuition and for phone bill, Gas Company and Power Company for gas or for electricity). |
| Amount | Limit the amount of available credit available to the sub-account. |
| Per Diem | A preset daily spending limit while the sub-account is active. |
| Velocity | Limit the number of transactions that can be processed using the sub-account. |
| Name | Restrict the sub-account number's use to a designated sub-account holder. This is ideal for gift cards relative to a primary account. (e.g. Person A, Person B, etc.). |
| Merchant/ Recurring | Set a specific recurring charge. (e.g. car payment for $399 on the 15$^{th}$ of each month, ending September 2006 to General Motors Credit for account #1234567). |
| Combinations | Other combinations are available such as: Combining velocity, amount and date Merchant, amount and time Name, amount, and date (for a business trip) |

FIG. 1 illustrates a generalized schematic overview of a system 100 in which an account owner sets up an account with one or more corresponding sub-accounts that are in turn, limited by corresponding spend controls in accordance with an implementation of the present invention. As shown, user 105 (or "account owner" 105) manages a primary account 103 through a management interface 113. Generally, management interface 113 can be any interface providing suitable access to account functions, such as those functions at bank 150, or such as those ultimately transmitted to bank 150 from the user's local computer. In particular, management interface 113 can include any computerized local or otherwise network-enabled (i.e., voice or data based Internet and/or telephonic) interface capable of managing and communicating preferences to bank 150.

As shown, user 105 uses management interface 113 to manage account settings 103. For example, account settings 103 can include the type of PIN used to access the primary account (e.g., 4, 5, 6, 7, 8, or 9 digit length PIN), as well as any other corresponding metrics described herein that may be used for authentication purposes. FIG. 1 also shows that user 105 can use management interface 113 to create one more sub-accounts, such as "sub-account A" having spend controls 115. For example, user 105 sets up account 103 as a business account, and desires to use sub-account A for traveling purposes. Alternatively, user 105 sets up account 103 as a general family account having a total spending limit of $10,000. User A then sets up sub-account A for a child's initial college expenditures, such as $1,000 to be used at a designated on-campus bookstore.

Upon setting up sub-account A at interface 113, message 110 is generated and ultimately sent to bank 150. Generally, message 110 can comprise any appropriate network communication having the indicia expected by bank 150 to complete the requested transaction. For example, message 110 may be formatted using any relevant, secure communication protocol functions. FIG. 1 also shows that message 110 can include a request associate sub-account A with primary account 103, and, as such, can also be prepared to include any user name and or PIN configurations initially set up by user 105. Assuming all the formatting and expected information is found by bank 150, bank 150 can process message 110, and set up sub-account A subject to the limitations initially set up with primary account 103.

To provide sub-account A with its own limitations, however, FIG. 1 shows that message 110 can further include a request to associate sub-account A with unique spend controls 115. Generally, spend controls 115 can include a wide variety of information, including authorization and spend limitation indicators, as previously described herein. For example, spend controls 115 can include an indication that sub-account A is to be associated with PIN 120. Generally, PIN 120 may be the same PIN used to access account 103, but more preferably will be a unique, random PIN of random length that is known by user 105 and ultimately by sub-user 125. In particular, PIN 120 can comprise a 6-digit code of randomly determined numbers. Thus, message 110 includes information that tells bank 150 to allow a user presenting sub-account A and PIN 120 at an appropriate merchant to be able to access x amount of funds. Assuming all aspects of message 110 are appropriate, bank 150 makes the corresponding sub-account A subject to the requested spend controls and PIN.

Accordingly, FIG. 1 shows that sub-user 125 (i.e., receiver of information corresponding to sub-account A) can then present the appropriate information to the authorized merchant. In particular, FIG. 1 shows that sub-user 125 presents a newly issued card 133, which carries a magnetic strip encoded in accordance with spend controls 115, to merchant 140. In one implementation, card 133 is any physically presentable credit, debit, or otherwise encoded gift card. In another implementation, card 133 is simply a representation of an electronic gift card presented by sub-user 125 over an Internet connection.

Upon receiving card 133, merchant 140 can determine whether it is authorized to accept card 133 for the requested transaction 145 (e.g., purchase of books at campus bookstore, or generalized purchase in a specific geographic region), and may be enabled to simply reject the transaction immediately. In the illustrated case, however, merchant 140 finds no problem in card 133, and passes the relevant information for transaction 145 and sub-account A in a new message 155 to bank 150. At bank 150, determination module 130 processes message 155, and parses the information contained therein to determine if transaction fits within the parameters defined for sub-account A.

For example, determination module 130 might identify that transaction 145 involves bookstore purchases within an acceptable geographic region, and that the transaction amount is within the available limit prescribed in spend controls 115. If, at any point, determination module 130 identifies that transaction 145, or even a PIN presented with card 133, is outside of the bounds prescribed by spend controls 115, determination module 130 can immediately deny the transaction, and send an warning message (not shown) to user 105. In the illustrated example, however, determination module 130 processes and accepts transaction 145, and sends corresponding message 155, which indicates that the requested transaction has been granted.

One will appreciate that, at any time, user 105 can send appropriate information that would invalidate the information known to sub-user 125. For example, in accordance with an implementation of the present invention, user 105 can call (or connect to via the Internet) bank 150, and change PIN 120 to another number, such as a 7-digit number, or a different 6-digit number. Similarly, user 105 can call and change the allowed merchants, change the geographic region in which card 133 can be used, and/or cancel sub-account A. Accordingly, user 105 maintains continual, ongoing control over the use of card 133 by virtue of control over sub-account A.

Figure 2:
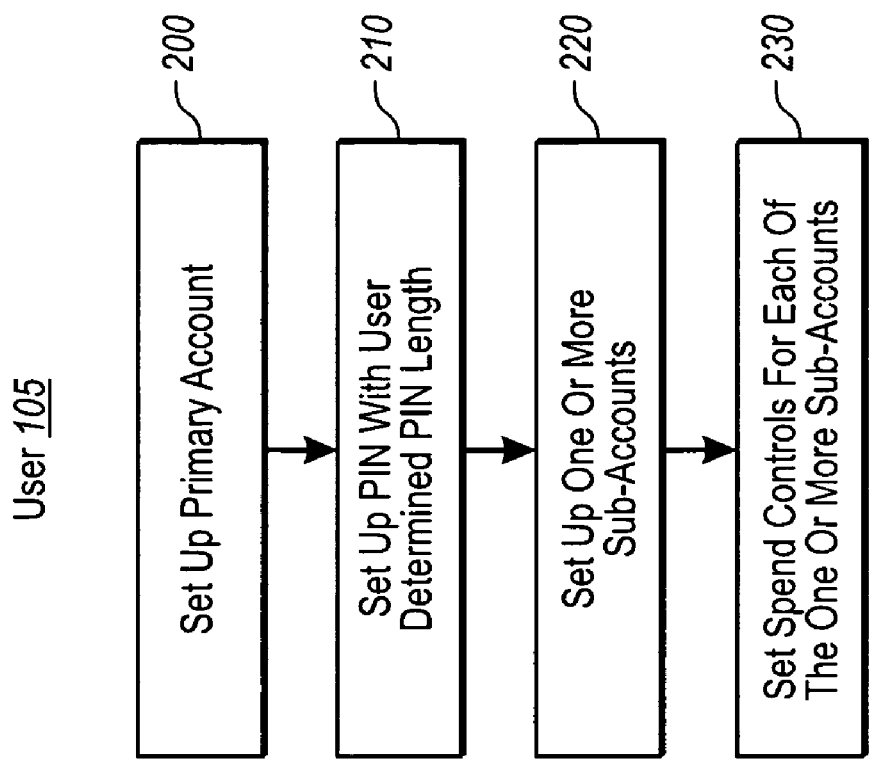
FIG. 2 illustrates a flowchart of acts in a method in accordance with an implementation of the present invention for setting up one or more sub-accounts with one or more spend-controls.

Implementations of the present invention can also be described in terms of flowcharts of methods comprising one or more acts for performing a particular result. In particular, FIG. 2 illustrates a flowchart of a method from the perspective of user 105 for setting up one or more sub-accounts that have corresponding spend controls. The acts of FIG. 2 are described below with reference to the components of FIG. 1, the corresponding text, and the general description herein.

For example, FIG. 2 shows that a method of setting up one or more sub-accounts associated with a primary account can comprise an act 200 of setting up a primary account. Act 200 includes setting up a primary account with an account institution (e.g., a bank, credit/debit agency, etc.). For example, user 105 sets up primary account 103 via management interface 113, or simply walks into bank 150 and sets up a traditional credit/debit account. In so doing, the user may set up associated account settings, such as total spend limits, the extent to which the user can associate additional sub-accounts with the primary account, and any other privileges pursuant to the same.

In addition, FIG. 2 shows that the method comprises an act 210 of setting up a PIN with a user-determined PIN length. Act 210 includes setting up a unique personal identification number for the primary account, wherein the unique personal identification number comprises a number length and number value that is determined and set by the user. For example, user 105 enters bank 150 and, rather than determining a 4-digit PIN, sets up a 6-digit PIN to be used with account 103, and further determines a numeric value for the account. The user may also enter any other security metrics determined appropriate by the user, such as biometric data (i.e., fingerprint scans, etc.), username and password information, and so on.

FIG. 2 also shows that the method comprises an act 220 of setting up one or more sub-accounts. Act 220 includes setting up one or more sub-accounts corresponding to the primary account, the one or more sub-accounts providing a sub-account holder with access to at least a portion of funds available to the primary account. For example, user 105 creates sub-account 107, whether at bank 150, or through management interface 113.

Furthermore, FIG. 2 shows that the method comprises an act 230 of setting spend controls for each of the one or more sub-accounts. Act 230 includes setting up spend controls for at least one of the one or more sub-accounts, such that the at least one sub-account is associated with a specific user chosen by the primary account owner, and further associated with certain security data to enable transaction processing. For example, user 105 indicates in spend controls 115 that sub-account A can only be used at merchant 140 within a certain geographic locale. User 105 may also associate certain security metrics with sub-account A, such as biometric data for the assigned user, a user name and password, and/or a new PIN (e.g., PIN 120) that, is unique for this account. As described herein, PIN 120 need not be the same number of digits as the PIN for the primary account, and is also preferably an entirely different numerical value as the PIN used for the primary account.

As such, implementations in accordance with the present invention provide for verification of the user on the front-end of the transaction, instead of catching fraud after the fact. Furthermore, implementations of the present invention remove the need for wiring funds in some instances, hence putting more money into the primary account owner's checking account. In particular, the primary account owner acts in some respects as an issuing bank for available funds, and thus has improved control on funds in the primary or secondary account, which is tied to the primary account, are used.

The systems disclosed herein are easily configurable for use with present systems since present systems are already configured to use PINs in many instances. Accordingly, the present systems can be easily implemented with existing ATM/Debit/Check systems, which require a PIN at the point-of-sale. Of course, the system is easily used where PINs are needed in credit card purchases as well. Online payment systems can be easily configured with a module that requires entry of a PIN, which therefore add another layer of security for credit card purchases made online.

Thus, the present invention provides a number of advantages both to banks and to account owners. For example, because of improved fraud protection, an issuing bank is likely to sell a larger number of accounts to a larger variety of customers that are likely to stay with the card longer than ordinary. For the issuing bank, at least this advantage can have implications for higher volume of fees paid over the long term. Card holders, by contrast, can have increased control of credit card accounts, increased security, new and flexible credit card capabilities, easier implementation and control in a business setting, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention also allows for issuing banks to charge a small fee for activation or deactivation of a sub-account. For example, an issuing bank would charge $0.02 for each spend-control instigated on a sub-account. Pricing can be adjusted based on back-end requirements to support each feature, or any other criteria dictated by the issuing bank, and can even have an automatic renewal fee if desired. For example, a business owner can activate a sub-account for a traveling employee that is enabled for Houston, Tex. for a week. The activation costs the owner $0.10 for 5(five) spend controls. If the business trip ends up extending another week, the issuing bank can be set up to charge an additional nominal fee, such as, for example, $0.10, to the primary account.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An electronic account access card, comprising:
a plate; and
an information storage device coupled to the plate and configured to store access authorization information,
wherein the information storage device is configured to be read by a card reader, the card reader being configured to receive an entry of a sub-account PIN associated with an electronic sub-account and the electronic sub-account is configured to provide access to at least a portion of funds available to a primary electronic account,
wherein the access authorization information and the sub-account PIN together are configured to allow for authorizing access to perform an electronic transaction associated with the electronic sub-account, other than a restricted transaction,
wherein the restricted transaction is associated with the access authorization information,
wherein the electronic sub-account is configured to be activated by the sub-account PIN, the sub-account PIN being same as a PIN for the primary electronic account, and
wherein the electronic sub-account is configured to be deactivated by the sub-account PIN.

2. The card as recited in claim 1, wherein the sub-account PIN associated with the electronic account is between 4 and 7 digits in length.

3. The card as recited in claim 1, wherein the restricted transaction is further associated with at least one of time and day restrictions, a spending limit, a geographic location, and a number of transactions.

4. A method comprising:
setting up a primary electronic account;
generating a minimum length value for a PIN for the primary electronic account;
producing a number of digits to form the PIN, the number of digits defined by said generated length;
setting up one or more sub-accounts corresponding to the primary electronic account, the one or more sub-accounts configured to provide access to at least a portion of funds available to the primary electronic account using sub-account PINs associated with the one or more sub-accounts;
setting up one or more spend controls for at least one of the one or more sub-accounts; and
activating at least one of the one or more sub-accounts with the associated sub-account PIN, wherein the associated sub-account PIN is same as the PIN for the primary electronic account; and
deactivating the at least one of the one or more sub-accounts with the associated sub-account PIN.

5. The method as recited in claim 4, wherein the PIN is any of a 5, 6, or 7-digit number.

6. The method as recited in claim 4, wherein at least one of the one or more spend controls is configured to allow the at least one of the one or more sub-accounts to have access to an entirety of the primary electronic account.

7. The method as recited in claim 4, wherein at least one of the one or more spend controls is configured to allow the at least one of the one or more sub-accounts to be activated for a single transaction.

8. The method as recited in claim 4, wherein at least one of the one or more spend controls is configured to allow the at least one of the one or more sub-accounts to be activated for one or more of a specified time period, a specified merchant, and a specified geographic location.

9. The method as recited in claim 4, wherein at least one of the one or more spend controls is configured to allow access to the one or more sub-accounts for a maximum daily amount for a specified time period.

10. The method as recited in claim 4, further comprising:
activating at least one of the one or more sub-accounts with the associated sub-account PIN, wherein the associated sub-account PIN is different from the PIN for the primary electronic account; and
deactivating the at least one of the one or more sub-accounts with the associated sub-account PIN.

11. The method as recited in claim 4, further comprising:
presenting a sub-account of the one or more sub-accounts to a merchant to pay for a transaction; and upon request, presenting the sub-account PIN associated with the sub-account.

12. The method as recited in claim 11, wherein the presenting the sub-account PIN associated with the sub-account includes accessing the sub-account PIN embedded in a magnetic strip of a card in response to an electronic request for verification from an account granting institution.

13. The method as recited in claim 4, wherein the one or more sub-accounts and the one or more spend controls are set up through a telephonic or network-based management interface that is remote from an account granting institution.

14. A method comprising:
   receiving a request to setup one or more sub-accounts corresponding to a primary electronic account;
   determining one or more spend controls and a number of digits for a sub-account PIN for at least one sub-account of the one or more sub-accounts, wherein the number of digits for the sub-account PIN is defined by a length of the sub-account PIN;
   receiving a transaction request, wherein the transaction request includes an identification of a sub-account number for the at least one sub-account;
   determining whether the transaction request is allowed based on the one or more spend controls and the sub-account PIN for the at least one sub-account; and
   billing the primary electronic account for activation or deactivation of the one or more spend controls associated with the at least one sub-account.

15. The method as recited in claim 14, wherein the determined number of the digits for the sub-account PIN is at least 5.

16. The method as recited in claim 14, further comprising:
   sending a request for the sub-account PIN for the at least one sub-account in response to receiving the transaction request.

17. The method as recited in claim 14, further comprising:
   receiving a deactivation request for the at least one sub-account, the deactivation request including the sub-account PIN for the at least one sub-account; and
   denying the transaction request.

18. The method as recited in claim 14, wherein the determining whether the transaction request is allowed based on the one or more spend controls and the sub-account PIN for the at least one sub-account further comprises:
   identifying data of at least one of:
      (i) a geographic location;
      (ii) an amount of the transaction request;
      (iii) a time of day for the transaction request;
      (iv) biometric data associated with the at least one sub-account; and
      (v) a number of times a transaction has been requested for the at least one sub-account; and
   comparing the identified data with the one or more spend controls associated with the at least one sub-account.

19. A system comprising:
   means for setting up a primary account;
   means for generating a minimum length for a PIN for the primary account;
   means for producing a number of digits to form the PIN, the number of digits being at least as great as said generated minimum length;
   means for setting up one or more sub-accounts corresponding to the primary account, the one or more sub-accounts configured to provide access to at least a portion of funds available to the primary account using sub-account PINs associated with the one or more sub-accounts;
   means for setting up one or more spend controls for at least one of the one or more sub-accounts;
   means for activating at least one of the one or more sub-accounts with the associated sub-account PIN, wherein the associated sub-account PIN is same as the PIN for the primary electronic account; and
   means for deactivating the at least one of the one or more sub-accounts with the associated sub-account PIN.

20. A tangible computer-readable medium having stored thereon, computer-executable instructions that, if executed by a computing device, cause the computing device to perform operations comprising:
   generating a minimum length value for a PIN for a primary account;
   producing a number of digits to form the PIN, the number of digits defined by said generated length;
   setting up one or more sub-accounts corresponding to the primary account, the one or more sub-accounts configured to provide access to at least a portion of funds available to the primary account using sub-account PINs associated with the one or more sub-accounts;
   setting up one or more spend controls for at least one of the one or more sub-accounts;
   activating at least one of the one or more sub-accounts with the associated sub-account PIN, wherein the associated sub-account PIN is same as the PIN for the primary electronic account; and
   deactivating the at least one of the one or more sub-accounts with the associated sub-account PIN.

21. A system comprising:
   means for receiving a request to setup one or more sub-accounts corresponding to a primary account;
   means for determining one or more spend controls and a number of digits for a sub-account PIN for at least one sub-account of the one or more sub-accounts, wherein the number of digits for the sub-account PIN is defined by a length of the sub-account PIN;
   means for activating at least one of the one or more sub-accounts with the associated sub-account PIN, wherein the associated sub-account PIN is same as the PIN for the primary electronic account;
   means for receiving a transaction request, wherein the transaction request includes an identification of a sub-account number for the at least one sub-account;
   means for determining whether the transaction request is allowed based on a time of day restriction associated with the transaction request, the one or more spend controls and the digits for the sub-account PIN for the at least one sub-account; and
   means for deactivating the at least one of the one or more sub-accounts with the associated sub-account PIN.

22. A tangible computer-readable medium having stored thereon, computer-executable instructions that, if executed by a computing device, cause the computing device to perform operations comprising:
   receiving a request to setup one or more sub-accounts corresponding to a primary account;
   determining one or more spend controls and digits for a sub-account PIN for at least one sub-account of the one or more sub-accounts, wherein the number of digits for the sub-account PIN is defined by a length of the sub-account PIN;
   activating at least one of the one or more sub-accounts with the associated sub-account PIN, wherein the associated sub-account PIN is same as the PIN for the primary electronic account;

receiving a transaction request, wherein the transaction request includes an identification of a sub-account number for the at least one sub-account;

determining whether the transaction request is allowed based on a time of day restriction associated with the transaction request, the one or more spend controls and the digits for the sub-account PIN for the at least one sub-account; and deactivating the at least one of the one or more sub-accounts with the associated sub-account PIN.

* * * * *

UNITED STATES PATENT AND TRADEMARK OFFICE
CERTIFICATE OF CORRECTION

| | | |
|---|---|---|
| PATENT NO. | : 7,954,704 B1 | Page 1 of 1 |
| APPLICATION NO. | : 11/350205 | |
| DATED | : June 7, 2011 | |
| INVENTOR(S) | : Gephart et al. | |

It is certified that error appears in the above-identified patent and that said Letters Patent is hereby corrected as shown below:

Title page, item (73), under "Assignee", in Column 1, Line 2, delete "Compnay," and insert -- Company, --.

Page 2, item (56), under "Other Publications", in Column 2, Line 11, delete "page" and insert -- page of --.

Signed and Sealed this

Eleventh Day of October, 2011

David J. Kappos
*Director of the United States Patent and Trademark Office*